United States Patent [19]
Vitale

[11] Patent Number: 4,937,481
[45] Date of Patent: Jun. 26, 1990

[54] PERMANENT MAGNET LINEAR ELECTROMAGNETIC MACHINE

[75] Inventor: Nicholas G. Vitale, Albany, N.Y.

[73] Assignee: Mechanical Technology Incorporated, Latham, N.Y.

[21] Appl. No.: 297,067

[22] Filed: Jan. 13, 1989

[51] Int. Cl.$^5$ ............................................. H02K 33/00
[52] U.S. Cl. ..................................... 310/15; 310/13; 310/14
[58] Field of Search .................... 310/12, 13, 14, 15, 310/30, 23

[56] References Cited

U.S. PATENT DOCUMENTS

| 4,349,757 | 9/1982 | Bhate | 310/15 |
| 4,454,426 | 6/1984 | Benson | 310/15 X |
| 4,827,163 | 5/1989 | Bhate et al. | 310/15 |

Primary Examiner—Patrick R. Salce
Assistant Examiner—Judson H. Jones
Attorney, Agent, or Firm—Kane, Dalsimer, Sullivan, Kurucz, Levy, Eisele & Richards

[57] ABSTRACT

A linear reciprocating electromagnetic machine has an outer stator member having axially spaced apart pole pieces, an open-slot coil cavity housing a coil, and an inner stator member spaced from the outer stator member and providing means for completing a path for magnetic flux. The machine also includes a permanent magnet plunger arranged for reciprocation with respect to the stator members and within the space between such stator members. The plunger is provided with three permanent magnet segments arranged axially along the plunger such that the interface zones between the magnet segments are substantially within the region defined by the stator pole pieces for all operating axial positions of the plunger. The two outer magnet segments are of equal axial length while the center magnet segment is axially longer than an outer magnet segment by an amount equal to the axial length of the open slot of the coil cavity.

9 Claims, 1 Drawing Sheet

PERMANENT MAGNET LINEAR ELECTROMAGNETIC MACHINE

BACKGROUND OF THE INVENTION

1. Field of the Invention

The present invention relates generally to an electromagnetic machine for converting mechanical energy into electrical energy and vice versa. In particular, the present invention relates to a reciprocating linear electromagnetic machine comprising a stator, a coil mounted in the stator for generating magnetic flux, and a plunger having a plurality of magnetic segments dispose axially and of alternating polarity arranged for reciprocation with respect to the stator. The present invention also relates to the invention of the copending patent application of Suresh K. Bhate and Nicholas G. Vitale, entitled "A Monocoil Reciprocating permanent Magnet Electric Machine With Self Centering Force", Ser. No. 835,957, filed Mar. 4, 1986, and assigned to the same assignee as the present invention, now U.S. Pat. No. 4,827,163.

2. Description of the Prior Art

Linear electromagnetic machines are known which comprise a stator having a plurality of axially spaced coils for generating a magnetic flux and a permanent magnet plunger reciprocating with respect to the stator. Examples of such machines are found in U.S. Pat. Nos. 4,349,757 to Bhate and 4,454,426 to Benson. A machine employing a single coil mounted in the stator is found in the foregoing referenced copending patent application.

In the Bhate patent No. 4,349,757 the magnets are of equal axial lengths with alternately oriented radial polarities and are spaced apart axially on centers equal to the corresponding spacing between the coils in the patent to, Benson No. 4,454,426 the machine is designed so that all magnetic segments are of equal axial length and are disposed at intervals of one-half the center to center spacing of the coils (see col. 6, lines 39–43). Such machines generally exhibit higher inductance and a lower power factor than is desired for most applications necessitating the need to provide for external power factor correction means which increases the cost of the machine. Machine designs exhibiting lower inductance and higher power factor require a large amount of permanent magnet material resulting in a machine which is too expensive for most commercial applications.

Accordingly, it would be very desirable to provide a linear electromagnetic machine with lower inductance and a higher power factor while at the same time not requiring a large increase in the amount of magnetic material.

In the foregoing referenced copending patent application a plunger having permanent magnet segments is arranged for linear reciprocation with respect to a stator having axially spaced-apart pole pieces and an electric coil for generating magnetic flux. The plunger has first and second axially spaced-apart outer permanent magnet segments provided at its respective ends. The plunger also has first and second axially spaced-apart inner permanent magnet segments provided at its respective ends and axially inward of the outer magnet segments. The first and second outer magnet segments are both magnetized radially in the same direction, while the first and second inner magnet segments are also each magnetized in the same direction but which direction is opposite that of the outer magnet segments. In operation, an outer magnet segment interacts with one stator pole piece while an inner magnet segment simultaneously interacts with the other axially spaced pole piece. For example, for a first extreme axial position of the plunger the first outer magnet segment would be adjacent one stator pole piece while the second inner magnet segment would be adjacent the other pole piece which is axially spaced from the one pole piece. Similarly, in the other extreme axial position of the plunger the second outer magnet segment would be adjacent that one pole piece while the first inner magnet segment would be adjacent the other stator pole piece.

SUMMARY OF THE INVENTION

Briefly stated, in accordance with one aspect of the present invention there is provided a linear reciprocating electromagnetic machine comprising a stator defining axially spaced-apart pole pieces, a coil cavity having an open-slot of preselected axial length, a coil housed within the coil cavity and a plunger arranged for reciprocation with respect to the stator. The plunger carries three permanent magnet segments arranged axially thereon such that the interface zones between the magnet segments are substantially within the region defined by the stator pole pieces for all axial operating positions of the plunger. The two outer or end magnet segments are of equal axial length and the inner or center magnet segment is axially longer than an outer magnet segment. The center magnet segment is preferably axially longer than an outer magnet segment by an amount equal to the axial length of the open stator slot.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF THE INVENTION

Figure 3:
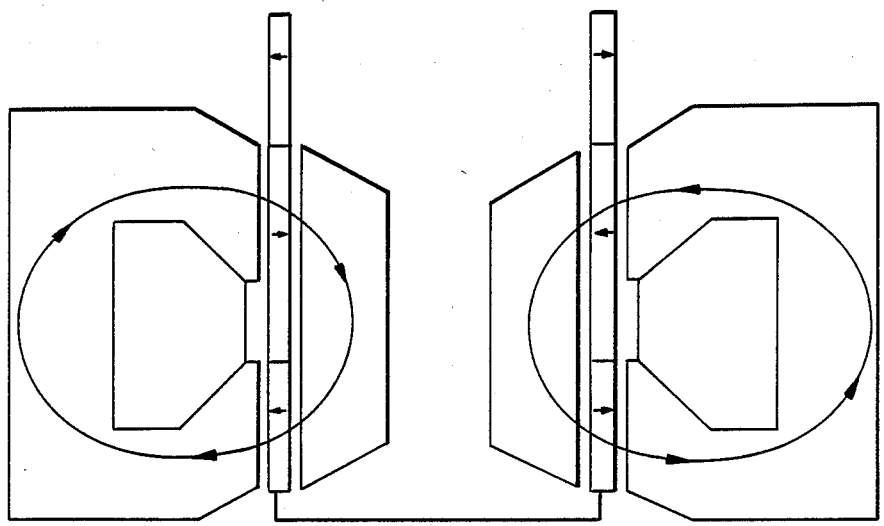
FIG. 3 shows a schematic sectional view of the machine of this invention with the plunger in a second extreme position.
Figure 2:
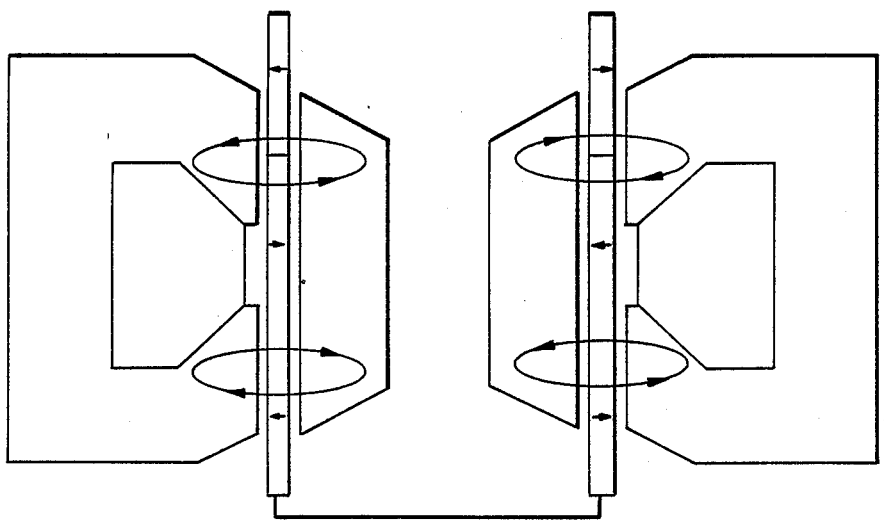
FIG. 2 shows a schematic sectional view of the machine constructed in accordance with this invention with the plunger in a center position.
Figure 1:
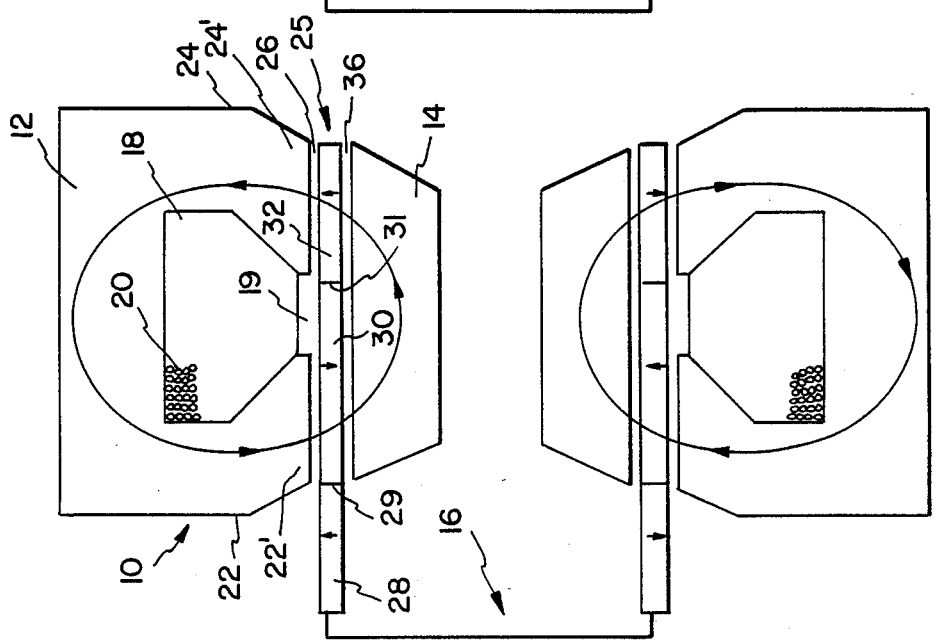
FIG. 1 shows a schematic side sectional view of a machine constructed in accordance with one embodiment of this invention with the plunger in a first extreme position.

Referring now to FIGS. 1–3, a linear reciprocating machine 10 comprises an outer stator 12, an inner stator 14 and, a plunger 16 disposed within the space therebetween. The stators 12 and 14 and the plunger 16 are constructed and arranged so that the plunger may be moved axially in a reciprocating motion with respect to the stators 12 and 14 or vice versa. The stators are made of a material having very high magnetic permeability such as magnetic steel. In order to eliminate circumferential eddy currents, the stators are formed of radial laminations. To achieve the most efficient machine none of the other components must be made of high conductivity or magnetic materials. That is, the support structure and any internal components should be constructed of materials which are nonmagnetic and of high resistivity.

The outer stator 12 is made up from radial laminations stacked in such a manner as to form a cylindrical body with an annular cavity 18 having an open-slot 19 for housing a single toroidal coil 20. The laminations are C-shaped with extending legs 22 and 24 and an opening which forms the coil cavity 18. The width of the lamination is determined by the amount of flux it has to carry. When the laminations are stacked to form the outer stator 12, the tips of the C-shaped laminations form a pair of axially spaced-apart pole pieces 22' and 24' each having an axial length "d" which is related to the design stroke. These pole pieces 22' and 24' form A space 25 with the inner stator 14.

Plunger 16 comprises a plurality of permanent magnet segments 28, 30, and 32 magnetized radially and of alternating polarity. The magnet segments are arranged such that the interface zones 29 and 31 between the magnet segments are substantially within the region defined by the pole pieces 22' and 24' for all operating axial positions of the plunger 16. The plunger 16 is disposed within the space 25 defined between the pole pieces 22' and 24' of outer stator 12 and the inner stator 16 and define air gaps 26 and 36 on opposite sides of the magnet segments 28, 30, and 32.

Air gaps 26, and 36 separate the plunger 16 from the outer and inner stators 12 and 14. The outer or end magnets 28 and 30 are magnetized in a first direction, while the inner or center magnet 30 is magnetized in the opposite direction. The outer magnets 28, 32 are of equal axial lengths while center magnet 30 has an axial length greater than that of an outer magnet 28 or 32. Preferably center magnet 30 is longer by an amount equal to the axial length of slot 19.

The permanent magnet segments 28, 30, and 32 are preferably made of a material having high magnetic strength such as samarium cobalt. Since such materials are usually fairly weak structurally and mechanically, the magnets are preferably secured to a suitable mounting member (not shown) made of a non-magnetic, high resistivity material.

Ideally, the magnets 28, 30, and 32 should be magnetized radially. Alternatively, radial orientations can be approximated by using a large number of magnet segments of rectangular shape arranged to form a ring with approximately radial orientation. Various configurations for structurally forming such rings and holding them at approximate axial locations with respect to each other may be employed. Also since for many applications the mass of the reciprocating plunger should be kept to a minimum in order to minimize the inertial forces during reciprocating movement, the arrangement should aim for high structural integrity with minimum mass. A suitable arrangement is shown and described in the referenced copending patent application Ser. No. 835,957.

The explanation of the machine working as a force actuator, requires a recourse to the technique of energy gradient or what is customarily known as the "principle of virtual displacement." In the application of this technique, changes in the energy associated with the overall system are obtained as the plunger undergoes an infitesimal displacement. The force exerted on the surrounding is then obtained as the rate of change of work component of the total energy with respect to the displacement. While such an approach is necessary to obtain quantitative information, it is rather involved to obtain an appreciation of the working of the machine as a motor.

Perhaps the simplest way to gain such appreciation is to recognize that an electro-magnetic device such as the one under consideration, is merely an energy conversion device. Thus, it can work as a motor, if electrical energy is inputted, converting it to a mechanical form and it can work as an alternator, if mechanical energy is inputted converting it to electrical form. It so happens, that in some instances one of the modes of operation is much more readily described and understood. The explanation of the operation of the machine of this invention as an alternator is very straightforward only requiring application of Faraday's Law of Induction. For example, when the permanent magnet plunger 16 reciprocates relative to the stators 12 and 14, the flux linking the coil changes. This change of flux causes a voltage to be induced in the coil. From Faraday's Law of Induction the magnitude of the induced voltage is equal to the time rate of change of flux linkages of the coil.

This operation can be seen in more detail with the help of FIGS. 1 through 3.

FIG. 1 shows the plunger 16 in the extreme left position along with the flux paths. Note that the flux linking the coil is counterclockwise. FIG. 3 shows the plunger 16 in the extreme right position along with the flux paths. In this position, the flux linking the coil is clockwise. Thus, moving the plunger 16 from right to left causes the flux linkages of the coil to change from positive maximum to negative maximum. When the plunger is reciprocated between the left and right extremes the flux linkages of the coil also oscillate between the two extreme values. This variation of flux linkages, with respect to time, causes an AC voltage to be induced in the coil. The waveform of the induced voltage is obtained by differentiating this variation of flux linkages with respect to time.

It has been discovered that by providing the open slot 19 in the stator 12 the machine will exhibit lower inductance and an improved power factor while requiring only a small amount of additional permanent magnet material. In the present invention, the center permanent magnet segment 30 is made longer by an amount only equal to the axial length of the open slot 19. The cost of this additional magnet material is substantially less than the cost of capacitance and the like, as has been required in the past, to achieve a similar improvement in power factor. The advantages of this invention are achieved simply by providing an open-slot stator and a plunger with an inner or center permanent magnet segment 30 of greater axial lenght than that of the outer magnets 28 or 32. The three permanent magnet segments are arranged with respect to the stator such that the interface zones between the magnet segments 28, 30 and 32 are substantially within the region defined by the stator pole pieces 22' and 24' as illustrated in FIGS. 1, 2 and 3.

Obviously, numerous modifications may be made to the invention without departing from its scope as defined in the appended claims.

What is claimed is:

1. A linear electromagnetic reciprocating machine, comprising:
   a stator having end portions forming axially spaced-apart pole pieces, said stator further having a coil cavity with an open slot of predetermined axial length;
   a coil mounted in said coil cavity;
   a plunger arranged for reciprocation with respect to said stator, wherein said plunger has three permanent magnet segments of alternating polarity, said segments arranged in an axially adjacent, alternating polarity relationship such that there are two outer magnet segments and a center magnet segment and wherein the two outer magnet segments are of equal axial length and the center magnet segment is axially longer than an outer magnet segment, and such that the adjacent ends of the outer and center magnet segments define interface zones between said magnet segments, said interface zones between the magnet segments being substantially within the region defined by the stator pole pieces for all operating axial positions of said plunger; and flux return means associated with said stator for completing the magnetic circuit.

2. The machine recited in claim 1 wherein said center magnet segment is axially longer than an outer magnet segment by an amount equal to the axial length of the open slot of said stator coil cavity.

3. The machine recited in claim 1 wherein said plunger is in the form of a hollow cylinder and the magnet segments are radially polarized.

4. The machine recited in claim 2 wherein said plunger is in the form of a hollow cylinder and the magnet segments are radially polarized.

5. The machine recited in claim 1 wherein all components associated with the machine except for said stator, said coil, said magnet segments and said flux return means are made of material which is nonmagnetic and of high resistivity.

6. A linear electromagnetic reciprocating machine, comprising:

an outer stator member having end portions forming axially spaced-apart pole pieces, said stator member further having a cavity formed therein with an open-slot of predetermined axial length;

a coil mounted in the cavity in said stator member;

an inner stator member spaced radially from said outer stator member to define a space between the outer and inner stator members and to provide means for completing a magnetic circuit, and a plunger arranged for reciprocation within the space between said outer and inner stator members, wherein said plunger has three permanent magnet segments of alternating radial polarity, said magnet segments being arranged in an axially adjacent relationship such that there are two outer magnet segments and a center magnet segment and wherein the two outer magnet segments are of equal axial length and the center magnet segment is axially longer than an outer magnet segment and wherein the adjacent ends of the outer and center magnet segments define interface zones between said magnet segments, said interface zones between the magnet segments being substantially within the region defined by the stator pole pieces for all operating axial positions of said plunger.

7. The machine recited in claim 6 wherein said center magnet segment is axially longer than an outer magnet segment by an amount equal to the axial length of the slot of said stator cavity.

8. The machine recited in claim 7 wherein said magnet segments are made of material having high magnetic strength.

9. The machine recited in claim 8 wherein all components associated with said machine except for said stator members, said coil, and said magnet segments are made from materials which are nonmagnetic and of high resistivity.

* * * * *